United States Patent
Hazenbroek et al.

(10) Patent No.: US 6,830,508 B2
(45) Date of Patent: Dec. 14, 2004

(54) ROTARY SHACKLE WITH LOCK COLLAR

(76) Inventors: Jacobus Eliza Hazenbroek, Dansersweg 2, 3286 LH, Klaaswaal (NL); Jaco Gardenier, Kwartetstraat 60, 3281 JP, Numansdorp (NL)

( * ) Notice: Subject to any disclaimer, the term of this patent is extended or adjusted under 35 U.S.C. 154(b) by 0 days.

(21) Appl. No.: 10/405,652

(22) Filed: Apr. 2, 2003

(65) Prior Publication Data

US 2004/0198209 A1 Oct. 7, 2004

(51) Int. Cl.[7] .............................................. A22C 21/00
(52) U.S. Cl. ....................................... 452/188; 452/179
(58) Field of Search ................................ 452/179, 183, 452/184, 187, 188

(56) References Cited

U.S. PATENT DOCUMENTS

| | | | |
|---|---|---|---|
| 3,518,717 A | * | 7/1970 | Hamann et al. ............. 452/179 |
| 3,684,078 A | * | 8/1972 | Nielsen ....................... 452/179 |
| 5,092,815 A | * | 3/1992 | Polkinghorne .............. 452/179 |
| 5,366,406 A | * | 11/1994 | Hobbel et al. .............. 452/179 |
| 5,487,700 A | | 1/1996 | Dillard ........................ 452/188 |
| 6,010,398 A | * | 1/2000 | Mente ......................... 452/188 |
| 6,017,269 A | * | 1/2000 | Altenpohl, III ............. 452/188 |
| 6,179,701 B1 | * | 1/2001 | Tieleman .................... 452/179 |
| 6,179,702 B1 | | 1/2001 | Hazenbroek ................ 452/188 |
| 6,277,021 B1 | * | 8/2001 | Meyn .......................... 452/188 |
| 6,478,668 B2 | * | 11/2002 | Visser et al. ................ 452/179 |
| 2002/0090905 A1 | * | 7/2002 | Moriarty ..................... 452/188 |

FOREIGN PATENT DOCUMENTS

| | | | |
|---|---|---|---|
| EP | 0444782 A1 | * | 1/1991 |
| EP | 0786208 A1 | * | 1/1997 |

* cited by examiner

Primary Examiner—Charles T. Jordan
Assistant Examiner—Judith A. Nelson
(74) Attorney, Agent, or Firm—Thomas, Kaydon, Horstemeyer & Risley

(57) ABSTRACT

The shackle assembly (10) has a lock gear (22) non-rotatably mounted to the shackle (11). Lock collar (45) has inwardly projecting lock collar teeth (51) that engage with the lock gear teeth (28A–28D). When the lock collar is moved toward the lock gear against the bias of spring (58), the lock gear teeth (28) move into the interior cavity (50) of the lock collar. This protects the teeth of both the lock gear and the lock collar at all times.

17 Claims, 5 Drawing Sheets

ROTARY SHACKLE WITH LOCK COLLAR

FIELD OF THE INVENTION

This invention concerns shackles of the type that transport poultry carcasses in sequence along a processing path, particularly through a cut-up line where the poultry carcasses are cut apart. More particularly, the current invention concerns an improved rotary shackle assembly that locks the stirrups of the shackle in predetermined positions after the shackle has been rotated so as to present the bird carried in the stirrups of the shackle to a subsequent processing station.

BACKGROUND OF THE INVENTION

This invention is directed to an improved, durable rotary shackle for use on a poultry processing line that is of simple construction and that reliably locks the stirrups of the shackle in predetermined positions after the shackle has been rotated to the proper orientation for the next processing station in the processing line.

The typical prior art poultry processing conveyor line includes a suspended conveyor rail and a series of bird support shackles, each of which includes a trolley for rolling along the conveyor rail and a bird hanger, or shackle, suspended below the trolley, with a drive chain connecting the shackles in equally spaced series. The shackles have a pair of spaced depending stirrups that are configured to receive and hold the legs or hocks of the birds.

With this arrangement, the workers at the poultry processing line can suspend the birds by their legs or hocks from stirrups of the shackles by slipping them into the stirrups. The spaced suspension of the legs of the birds and the spaced relationship between the birds along the conveyor system allows the birds to be moved sequentially through the various processing stations, such as the cut-up machines, for serial processing of large numbers of the carcasses.

As poultry carcasses are processed at the various processing stations of the processing line, the carcasses are turned to present the carcasses in various attitudes to the different processing machinery to accommodate each of the processing steps. In some of these stations, it might be desirable to present the carcasses breast first, in other stations back first, and still other stations side first. In order to turn the bird, poultry shackles have been developed that include a turning block that is non-rotatably mounted to the shackle and that is shaped to engage turning pins or cams spaced at predetermined intervals along the poultry processing path. When a portion of the turning block reaches the turning pin, the turning block "walks around" the turning pin, so as to rotate the shackle and the bird, usually 90°.

In order to keep the bird hanger from inadvertently rotating with respect to the poultry processing line, the turning block typically includes flat surfaces about its periphery, and the flat surfaces are arranged to moved adjacent longitudinal guide rails that extend parallel to flat surfaces of a properly oriented turning block so that no inadvertent turning of the shackles or the birds suspended on the shackles will occur. An example of this type of rotary shackle is disclosed in U.S. Pat. No. 5,487,700.

While the above described rotary shackles have met with success in the poultry processing industry, there are times when the poultry conveyor system must be able to move the poultry shackles and the birds carried thereby up and down inclines, around curves and about combinations of curves and inclines. While the prior art turning blocks and guide rails are effective to retain poultry shackles in an approximately fixed attitude along horizontal, rectilinear runs of a conveyor system, the turning blocks and their necessary guide rails are more difficult to construct and operate for movement of the shackles about curves and inclines along the processing path and the guide rails would have been interrupted at the positions along the path where the shackles negotiate a turn, etc. Therefore, this would result in moving poultry shackles at certain intervals along the processing line without using the guide rails to maintain the shackles in a fixed position with respect to the poultry line. This would allow the birds to wander off alignment as they negotiated a curve, etc.

U.S. Pat. No. 5,092,815 illustrates a rotary shackle assembly that has a spring loaded ball bearing that registers with a detent, tending to hold the shackle in a non-rotary position with respect to its trolley. However, the ball and detent arrangement provides only a light restraining force to the tendency of the bird and shackle to rotate with respect to the trolley. The absence of a firm lock does not solve the problem of inadvertent rotation of the poultry carcass with respect to its trolley during those spans of the trolley system where the shackle is being elevated or turned. Also, this type of system still requires the guide rails at the processing stations.

U.S. Pat. No. 6,179,702 includes a more firm and reliable locking system for temporarily locking a shackle in a fixed position with respect to its processing line. A cam follower and its lock pin are carried by the hanger support, and the cam lock and its lock pin are movable so as to move the lock pin into and out of lock notches of the turning block. When the shackle moves between guide rails, the cam lock is engaged, thereby moving the lock pin out of a lock notch of the turning block and unlocking the turning block and its shackle and allowing them to rotate with respect to the processing line. When the shackle moves beyond its turning area, the force applied to the cam lock is released and a spring urges the lock pin back into engagement with the turning block, thereby locking the shackle in its new position.

One of the problems with the preceding described positioning lock is that a precise relationship must be maintained between the cam and the cam follower so as to reliably lock and release the shackle, and repeated use and wear applied to the cam and the lock notches results in unreliable locking of the shackle and requires that the cam lock occasionally be replaced for continued reliable operation. It is to the above noted and other problems of the prior art that this invention is directed.

SUMMARY OF THE INVENTION

Briefly described, the present invention comprises a rotary shackle for transporting poultry carcasses along a poultry processing line that reorients the shackles as the birds carried by the shackles are approaching a processing station, such as a cut-up station. The shackle assembly includes a turning block that engages turning pins at the entry of the various processing stations. The turning block is approximately square and includes turning slots at its corners that engage and "walk around" turning pins that are positioned along the path of the turning block. Upon engaging a turning pin, the turning block will rotate 90°. The turning block can be rotated 180° upon engagement of two consecutive turning pins. The turning block can be rotated in either direction by engaging turning pins on opposite sides of its processing path.

The shackle has a vertically oriented support rod with a first or upper end for suspension from a suspended conveyor line and a second or lower end for suspension below the upper end, with stirrups mounted on the lower end. The stirrups are configured for supporting the legs of a poultry carcass. The turning block is non-rotatably mounted to the support rod, so that when the turning block is rotated, the stirrups rotate in unison with the turning block.

A lock gear having lock gear teeth is non-rotatably mounted to the support rod, and the lock collar having lock collar teeth is rotatably mounted to the support rod. The lock collar is movable along the length of the support rod toward and away from engagement with the lock gear. The lock gear teeth and lock collar teeth are of complementary shape that lock together in response to the teeth coming together about the support rod.

When the shackle is to be rotated by its turning block, the lock collar and lock gear separate from each other, freeing up the shackle so that it can freely rotate. The turning gear then engages a turning pin and rotates the shackle to its desired position, whereupon the lock collar and lock gear re-engage each other, locking the shackle and the bird carried by the shackle in the proper position for presentation of the bird to the next processing station, such as to a cut-up station.

In the embodiment disclosed herein, the lock collar defines an interior space, with the lock collar teeth projecting into one portion of the cavity. Another portion of the cavity accommodates the lock gear teeth when the lock gear teeth are not in locking engagement with the lock collar teeth. When the lock collar moves longitudinally with respect to the shackle, the lock gear teeth move in the cavity until they engage and lock with respect to the lock gear teeth. With this arrangement, the lock gear teeth are always maintained inside the lock collar, so that the hazard of items becoming jammed between the teeth and of the teeth accumulating debris or other undesirable matter is substantially reduced. The lock collar forms a protective cover for its teeth and for the lock gear teeth.

DETAILED DESCRIPTION

Figure 1:
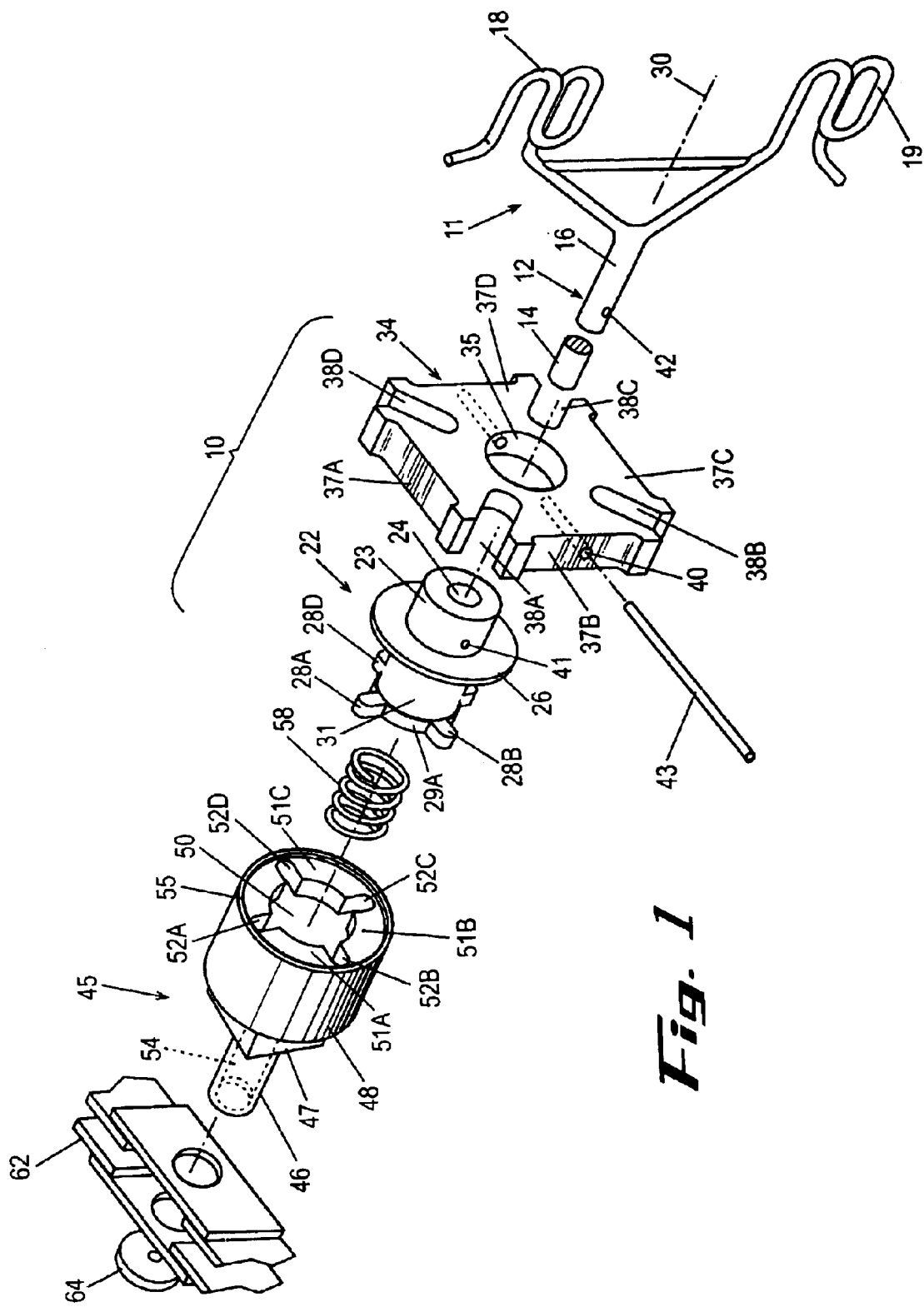
FIG. 1 is an expanded perspective illustration of the shackle assembly for transporting poultry carcasses along a poultry processing line.

Referring now in more detail to the drawings, in which like numerals indicate like parts throughout the several views, FIG. 1 illustrates in expanded format a shackle assembly 10 that includes a rectilinear support rod 12 that includes an upper end 14 and a lower end 16. Stirrups 18 and 19 are mounted on the lower end 16 of the support rod and include receptacles for receiving the hock or leg of a poultry carcass, such as that of a chicken, turkey, or other poultry species. The stirrups are spaced apart so that the legs of the bird will be appropriately spaced for presentation to a poultry processing station, such as to a cut-up station.

As shown in FIGS. 1, 6, 7 and 8, lock gear 22 includes a cylindrical body 23 that defines a longitudinal central opening 24, and annular closure flange 26 extends radially from the cylindrical body 23 intermediate the ends of the cylindrical body. Lock gear 22 includes radially outwardly projecting lock gear teeth 28A–28D, that radiate outwardly at 90° intervals about the longitudinal center line 30. Recesses 29A–29D extend circumferentially between the lock gear teeth 28A–28D.

Figure 2:
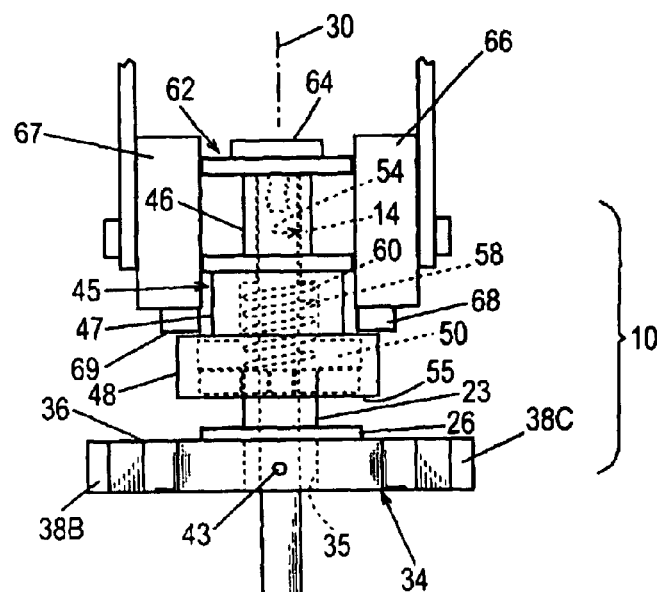
FIG. 2 is a side elevational view of the poultry shackle assembly of FIG. 1.
Figure 3:
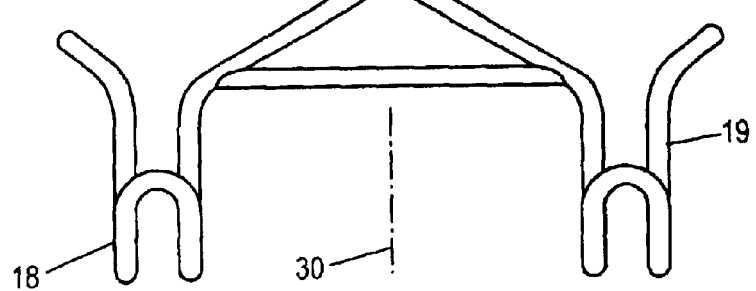
FIG. 3 is a plan view of the turning block that mounts on the support rod of the shackle.
Figure 3:
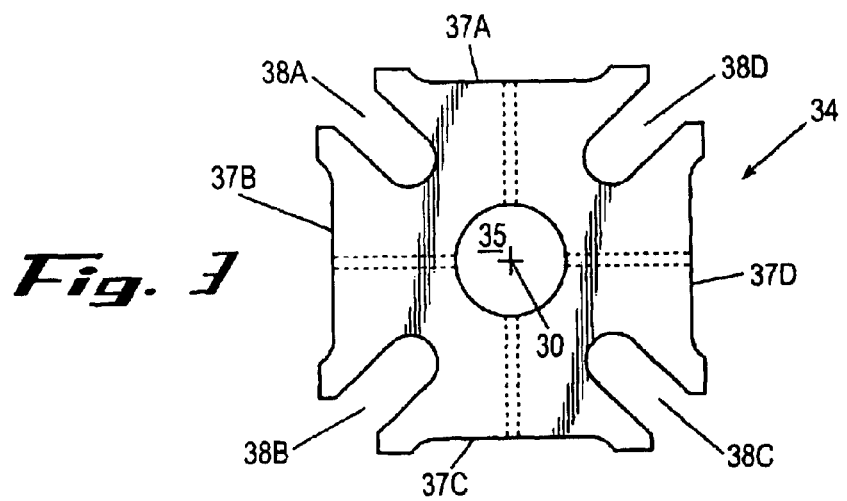

Lock gear 22 includes a neck portion 31 of its cylindrical body 23 that extends between annular closure flange 26 and lock gear teeth 28A–28D, so that the lock gear teeth are spaced from the annular closure flange 26. As shown in FIGS. 1–3, turning block 34 defines a central opening 35 that is telescoped about cylindrical body 23 of lock gear 22, with the annular closure flange 26 of the lock gear in abutment with the facing surface 36 of the turning block 34.

Turning block 34 is approximately square, having wings 37A–37D that radiate from longitudinal center line 30, and turning slots 38A–38D that are formed at the corners of the turning block and that extend radially inwardly toward the longitudinal center line 30. The turning slots are sized and shaped so as to engage against stationary turning pins (not shown) that are positioned adjacent the processing path, so that movement of the turning block along a processing path causes the turning slots to "walk over" the turning pins, resulting in the turning block rotating 90°. This is conventional in the art.

The turning block 34, lock gear 22, and support rod 12 each have a lock pin opening 40, 41 and 42, respectively, and lock pin 43 is inserted through these openings when they are aligned with one another, holding the support rod 12, lock gear 22, and turning block 34 in concentric overlying relationship with one another. This causes the lock gear 22 and turning block 34 to be non-rotatably mounted to the rectilinear support rod 12 of the shackle 11.

Figure 4:
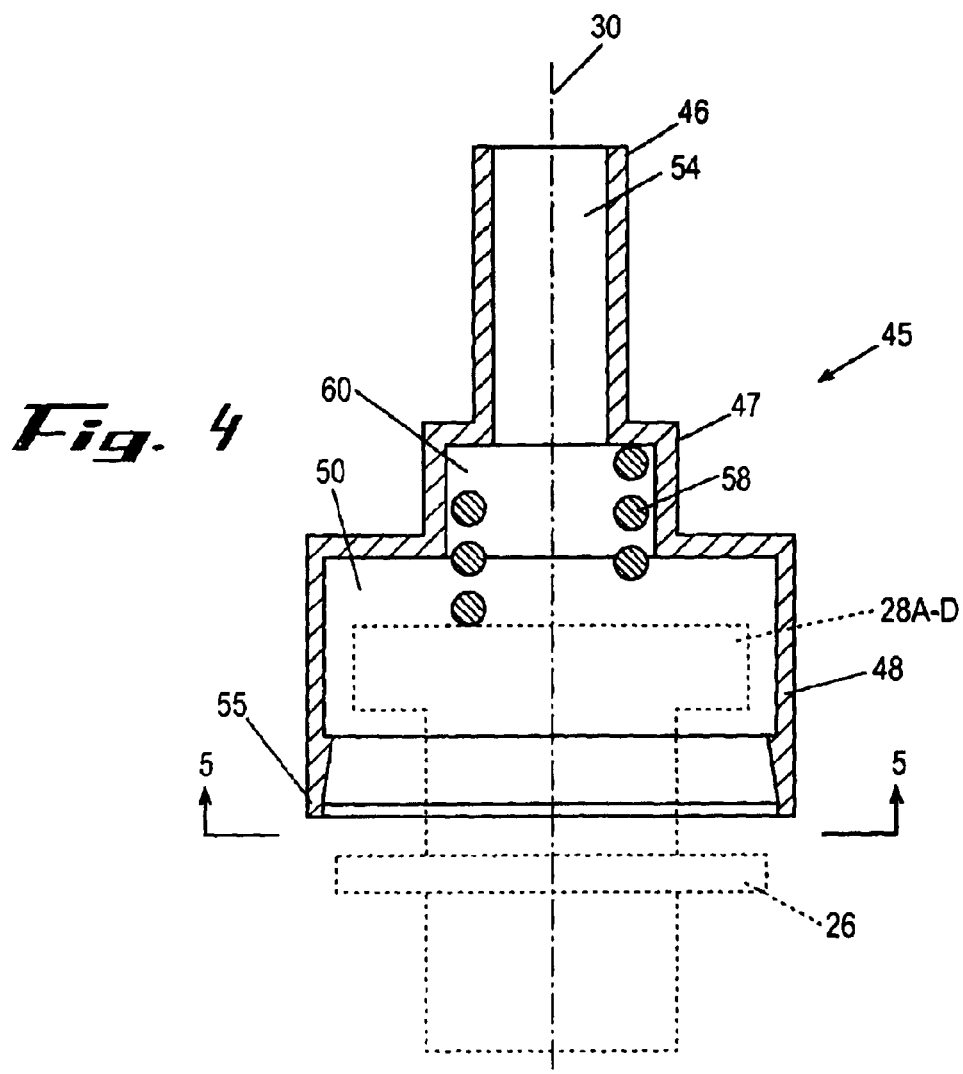
FIG. 4 is a side cross sectional view of the lock collar, taken along lines 4—4 of FIG. 5, with a dash line representation of how the lock gear fits into the cavity of the lock collar.

As illustrated in FIG. 4, lock collar 45 includes tubular stem 46, guide block 47, and side wall or skirt 48, with the stem, block and skirt 46–48 being concentric with one another for alignment with the longitudinal center line 30 of the shackle 11.

Figure 5:
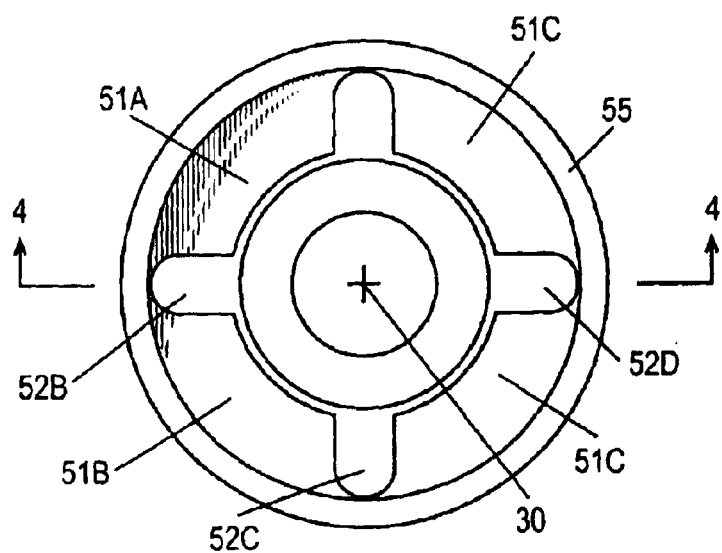
FIG. 5 is a bottom view of the lock collar, taken along lines 5—5 of FIG. 4.
Figure 6:
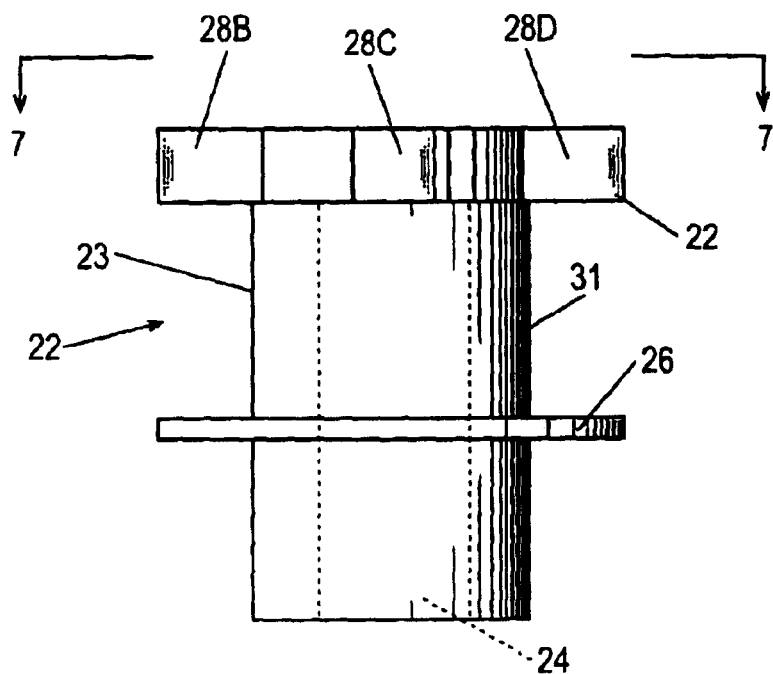
FIG. 6 is a side view of the lock gear.

Lock collar 45 defines an interior cavity 50 within the skirt 48, and, as shown in FIG. 5, radially inwardly extending lock collar teeth 51A, 51B, 51C, and 51D at the distal edge 52 of the lock collar skirt 48. Interior cavity 50 has a length extending along the longitudinal center line 30 that is greater than the length of the teeth 28A–28D of the lock gear 22. Spring cavity 60 opens into interior cavity 50.

As shown in FIGS. 2 and 5, longitudinal opening 54 extends through tubular stem 46 and opens into larger spring cavity 60 and spring cavity 60 extends into interior cavity 50. Thus, lock collar 45 is open-ended and is mounted on the rectilinear support rod 12 of shackle 11 by inserting the longitudinal opening 54 about the upper end of the support rod.

Figure 7:
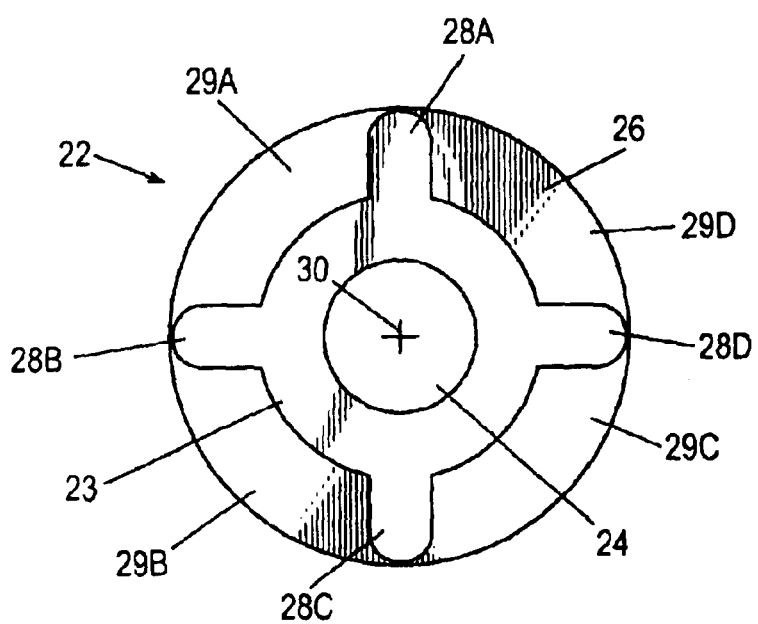
FIG. 7 is an end view of the lock gear, taken along lines 7—7 of FIG. 6.
Figure 8:
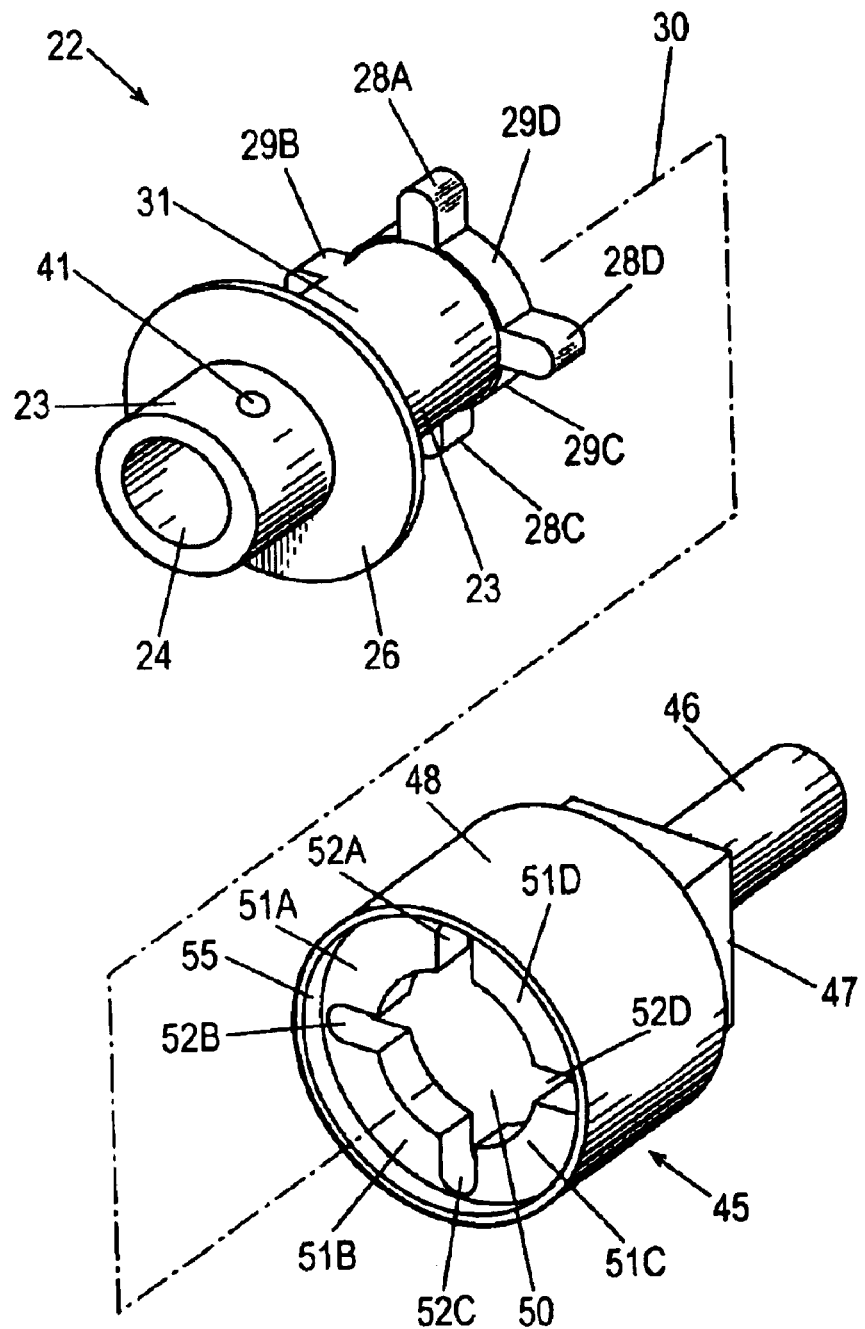
FIG. 8 is a perspective illustration of the lock collar and the lock gear, showing in dashed lines how the lock gear fits into the lock collar.

Teeth recesses 52A–52D are formed between the radially inwardly projecting lock collar teeth 51, with the teeth recesses 52 being slightly larger in length and width than the lock gear teeth 28A–28D (FIG. 7).

Lock collar 45 is mounted on rectilinear support rod 12 of shackle 11 by inserting the longitudinal opening 54 of the lock collar about the support rod 12 and sliding the lock collar so that its interior cavity 50 allows the lock gear teeth 28A–28D to pass through the teeth recesses 52A–52D of the lock collar, so that the lock gear teeth fit 28A–28D become positioned in the interior cavity 50 of the lock collar (see dashed line position of lock gear 22 in FIG. 4). The annular closure flange 26 of the lock gear 22 will engage against the facing surfaces of the radially inwardly projecting lock collar teeth 51, so as to close the cavity and limit the movement of the lock collar 45 against the lock gear 22.

Coil spring 58 is also telescopically moved onto support rod 12 of shackle 11, between the lock gear 22 and lock collar 45, and seats in the spring cavity 60 of the lock collar. Then upper end surface of the tubular stem 46 of lock collar 45 engages a facing link of conveyor 62, and the upper end of support rod extends through the links of the conveyor links and collar cap is threaded into the upper end of the support rod and supports the shackle 11 from the conveyor. The shackle 11 is rotatable with respect to the conveyor. However, the flat side surfaces of the guide block 47 move in close proximity with the collar side rails 66 and 67, prohibiting the guide block and the lock collar from rotating with respect to the path of travel of the conveyor.

The spring 58 urges the lock collar upwardly on the support rod 12 until the upper surface of the tubular stem 46 of the lock collar engages the link of the conveyor 62. When the lock collar moves toward engagement with the conveyor, the teeth 51A–51D of the lock collar move toward alignment with the teeth 28A–28D of the lock gear. If the teeth of the lock collar are aligned with the spaces of the lock gear, the lock collar and the lock gear become rotatably locked together.

Cam surfaces 68 and 69 extend from the lower surfaces of the collar guide rails 68 and 69 for engaging the upper surface of the skirt 48 and moving lock collar skirt 48 downwardly to disengage the lock collar teeth 51 from the lock gear teeth 28, leaving the shackle and its turning block free to rotate. It is at this moment that one of the turning slots 38 of turning gear 34 engages a turning pin and rotates the turning block and the shackle 11. When the turning block 34 and shackle 11 have been turned to their new position, the lock collar passes beyond the cams 68 and 69 and the lock collar is returned to its locked position by the spring 58 moving the lock collar downwardly until its teeth 51A–51D re-engage the turning gear teeth 28A–28D.

The dimensions of lock collar 45 are such that when the stem 46 of the lock collar moves upwardly by the bias of the spring 58 and engages the link of the conveyor 62, the lock collar cannot move any farther along the length of the support rod and its teeth do not pass beyond the lock gear teeth 28A–28D. Therefore, the lock collar 45 and the lock gear 22 will always be non-rotatably locked together due to the bias of spring 58, unless the lock collar 45 is moved downwardly by the cams 68 and 69 against the bias of spring 58 so that the lock gear teeth 28A–28D are received in the interior cavity 50 of the lock collar, where they are disengaged from the lock gear teeth 28. This frees the shackle 11 to rotate with respect to lock collar 45.

It will be noted that the interior cavity 50 of lock collar 45 will be substantially closed at all times because the lock gear teeth 28A–28D fill the teeth recesses 52A–52D of the lock collar when the teeth are meshed, and the annular closure flange 26 of the lock gear substantially closes the open end of the lock collar skirt 48 when the lock gear teeth are moved into the interior cavity 50. This arrangement protects the teeth of both the lock gear and the lock collar, and tends to avoid the accumulation of debris or other material about the teeth.

Guide block 47 of lock collar 45 travels between adjacent guide rods of the poultry processing line, so that the guide block does not rotate as it moves about the processing path. Therefore, when the shackle is to be rotated, the lock collar is urged downwardly against the bias of its spring 58 by a cam surface of the guide rods. This moves the radially inwardly projecting lock collar teeth 51 over the lock gear teeth 28 so that the lock gear teeth 28 become located in the interior cavity of the lock collar and the shackle 11 is free to rotate. This is when the turning block engages a turning pin and rotates the shackle to a new position. Once the shackle is rotated, the guide rod cam surface releases the depression of the lock collar and its spring 58 pushes the lock collar upwardly so that its radially inwardly projecting lock collar teeth 51A–51D again register with the lock gear teeth 28A–28D, once again locking the shackle and its bird in the desired position for entry into the next processing station of the poultry processing line.

Although preferred embodiments of the invention have been disclosed in detail herein, it will be obvious to those skilled in the art that variations and modifications of the disclosed embodiments can be made without departing from the spirit and scope of the invention as set forth in the following claims.

We claim:

1. A shackle assembly for transporting poultry carcasses along a poultry processing line, comprising:

a shackle having a support rod with a first end for upright suspension from a suspended conveyor line and a second end for suspension below said first end, said second end including stirrups mounted thereto and configured for supporting the legs of a poultry carcass, a turning block non-rotatably mounted to said support rod, a lock gear having lock gear teeth non-rotatably mounted to said support rod, a lock collar having lock collar teeth rotatably mounted to said support rod, said lock gear teeth and said lock collar teeth being of complementary shape that lock together in response to said lock gear and said lock collar moving with respect to each other along said support rod, said lock collar including a guide for engagement by a track extending along the conveyor line for maintaining said lock collar teeth in a non-rotatable condition with respect to the processing line as the shackle moves along the processing line, and for moving said lock gear teeth and said lock collar teeth with respect to each other along the length of said support rod, so that said shackle is locked in a non-rotatable condition with respect to the processing line by the engagement of the lock gear teeth and the lock collar teeth and is released from the non-rotatable condition when the lock gear teeth and lock collar teeth are separated.

2. The shackle assembly of claim 1, wherein:

said lock collar includes a housing defining an interior space and said lock collar teeth extend into said interior space, and said lock gear teeth movable inside said interior space into and out of locking engagement with said lock collar teeth.

3. The shackle assembly of claim 1, wherein:

said lock collar includes an end wall, and a side wall having one end connected to said end wall and open at its other end, and said lock collar teeth being mounted to said other end of said end wall at a position spaced from said end wall, and a space positioned between said lock collar teeth and said end wall sized and shaped for receiving the lock gear teeth internally of said lock collar teeth.

4. The shackle assembly of claim 1, wherein:

said lock gear teeth extend radially outwardly from said support rod, and said lock collar teeth extend radially inwardly toward said support rod.

5. The shackle assembly of claim 1, wherein:

said lock gear teeth and said lock collar teeth surround said support rod, and said lock collar is movable along said support rod.

6. The shackle assembly of claim 1, and further including:

a spring surrounding said support rod in engagement with both said lock collar and said lock gear for biasing said lock collar and said lock gear into predetermined positions with respect to each other.

7. The shackle assembly of claim 1, and further including:

a lock pin extending though said turning gear, said lock gear and said support rod and locking said turning gear, said lock gear and said support rod in overlying concentric relationship.

8. The shackle assembly of claim 1, means for limiting the movement of said lock collar along the support rod.

9. A shackle assembly for transporting poultry carcasses along a poultry processing line, comprising:

a shackle having a support rod with an upper end for suspension from a suspended conveyor line and a lower end for suspension below said upper end, said lower end including stirrups mounted thereto and configured for supporting the legs of a poultry carcass, a turning block mounted to said support rod, a lock gear having lock gear teeth non-rotatably mounted to said support rod, a lock collar having lock collar teeth rotatably mounted to said support rod, said lock gear teeth and said lock collar teeth being of complementary shape that lock together in response to said lock gear and said lock collar moving with respect to each other along said support rod, said lock collar including means for maintaining said lock collar teeth in a non-rotatable condition with respect to the processing line as the shackle moves along the processing line, so that said shackle is locked in a non-rotatable condition with respect to the processing line by the engagement of the lock gear teeth and the lock collar teeth and is released from the non-rotatable condition when the lock gear teeth and lock collar teeth are separated.

10. The shackle assembly of claim 9, wherein:

said lock collar teeth are movable along the length of said support rod into and out of engagement with said lock gear teeth.

11. The shackle assembly of claim 9, wherein:

said lock collar defines an internal chamber, and said internal chamber is movable about said lock gear teeth.

12. A shackle assembly for transporting poultry carcasses along a poultry processing line, comprising:

a shackle having a support rod with an upper end for suspension from a suspended conveyor line and a lower end for suspension below said upper end, said lower end including stirrups mounted thereto and configured for supporting the legs of a poultry carcass, a lock gear having lock gear teeth non-rotatably mounted to said support rod, a lock collar having lock collar teeth rotatably mounted to said support rod, said lock gear teeth and said lock collar teeth being of complementary shape that lock together in response to said lock gear and said lock collar moving with respect to each other, said lock collar having a skirt that surrounds said lock gear.

13. The shackle assembly of claim 12, wherein:

said lock collar and said lock gear extend concentrically about said support rod, said lock gear is non-movably affixed to said support rod and said support rod is movable longitudinally and rotatably with respect to said lock collar.

14. The shackle assembly of claim 12, wherein:

said lock collar and said lock gear are shaped and dimensioned so that said lock gear teeth are always retained within said lock collar skirt.

15. The shackle assembly of claim 12, wherein:

said lock collar skirt defines a cavity, and said lock collar is movable with respect to said lock gear so that said lock gear teeth are positioned in said cavity or are in engagement with the lock collar teeth.

16. A process of orienting the stirrups of a poultry shackle, the shackle including a support rod and stirrups mounted on said support rod and a lock gear non-rotatably mounted to the support rod, comprising:

moving a lock member along the length of the support rod of the shackle into locking engagement with the lock gear to hold the shackle from rotating, moving the lock member from locking engagement with the lock gear along the length of the support rod of the shackle out of locking engagement with the lock gear to allow the shackle to rotate, and rotating the shackle when the lock member is out of locking engagement with the lock gear.

17. The process of claim 16, wherein said lock member is a lock collar having cavity that surrounds the lock gear, and the step of moving the lock member into locking engagement with the lock gear comprises:

moving the cavity of the lock collar about the lock gear.

* * * * *